UNITED STATES PATENT OFFICE.

ANTHONY J. HINDEMEYER, OF PHILADELPHIA, PENNSYLVANIA.

COMPOSITION FOR WELDING STEEL.

SPECIFICATION forming part of Letters Patent No. 417,485, dated December 17, 1889.

Application filed October 14, 1889. Serial No. 326,982. (No specimens.)

*To all whom it may concern:*

Be it known that I, ANTHONY J. HINDEMEYER, a citizen of the United States, residing at Philadelphia, in the county of Philadelphia and State of Pennsylvania, have invented certain Improvements in Compositions for Welding Steel, of which the following is a specification.

As is well known, the welding together of pieces of steel, and more particularly Bessemer steel, has heretofore been found to be almost impossible, and the result of all attempts in that direction has proved to be more or less imperfect. This, from its peculiar constitution, has particularly been the case with Bessemer steel. As a consequence great loss has been entailed upon railway companies using that material for rails, for the reason that when they were once worn out it was found impossible to again work them up into rails, because of the lack of any efficient flux by which the old rails might be welded together when rolled. By the use of my composition I entirely overcome that difficulty, and old rails of Bessemer steel can be rerolled and made into rails as strong and perfect as those from which they are manufactured originally were.

My invention consists in combining ground chalcedony quartz or white flint, oyster-shells, table-salt, chloride of ammonia, and African or red ore.

I take one hundred pounds pulverized chalcedony quartz or white flint, twenty-five pounds of pulverized oyster-shells, two quarts of table-salt, two pounds of chloride of ammonia, and five pounds of African or red ore. These ingredients are all ground together until they are reduced to a powder and thoroughly mixed. The resultant compound is then applied by sprinkling or dusting the same over the metal when at a yellow or welding heat.

I do not confine myself to the application of my compound to the pieces of metal to be welded at any particular time before they are passed through the welding-rolls, nor do I confine myself to the use of rolls to effect the welding, as this may be accomplished by the use of hammers, stamps, or other mechanical devices suitable for the welding together of metals; neither do I confine myself to the use of the exact relative proportions of the ingredients as herein given, as for various metals and different classes of the same metal these proportions may be varied to obtain the best results.

Having thus described my invention, what I claim as new, and desire to secure by Letters Patent, is—

The compound for fluxing and welding together pieces of Bessemer or other steel by treating them with the compound herein described, consisting of chalcedony quartz or white flint, oyster-shells, table-salt, chloride of ammonia, and African or red ore, all ground and mixed together, substantially as specified.

A. J. HINDEMEYER.

Witnesses:
H. C. VANATTA,
ALLEN HUMMEL.